(12) United States Patent
Conley

(10) Patent No.: US 7,917,949 B2
(45) Date of Patent: *Mar. 29, 2011

(54) VOICE CONTROLLED PORTABLE MEMORY STORAGE DEVICE

(75) Inventor: Kevin M. Conley, San Jose, CA (US)

(73) Assignee: SanDisk Corporation, Milpitas, CA (US)

( * ) Notice: Subject to any disclaimer, the term of this patent is extended or adjusted under 35 U.S.C. 154(b) by 1134 days.

This patent is subject to a terminal disclaimer.

(21) Appl. No.: 11/314,522

(22) Filed: Dec. 21, 2005

(65) Prior Publication Data

US 2007/0143833 A1    Jun. 21, 2007

(51) Int. Cl.
*H04L 9/32* (2006.01)
*G06F 12/00* (2006.01)
*G06F 13/28* (2006.01)

(52) U.S. Cl. .......... 726/20; 726/5; 726/17; 726/21; 726/28; 713/1; 713/184; 713/186; 713/182; 380/201; 382/200; 382/115; 711/103; 365/185.11

(58) Field of Classification Search .............. 726/20
See application file for complete search history.

(56) References Cited

U.S. PATENT DOCUMENTS

| | | | |
|---|---|---|---|
| 5,365,574 A | 11/1994 | Hunt et al. | |
| 5,570,315 A | 10/1996 | Tanaka et al. | |
| 5,774,397 A | 6/1998 | Endoh et al. | |
| 5,873,064 A | 2/1999 | De Armas et al. | |
| 6,046,935 A | 4/2000 | Takeuchi et al. | |
| 6,081,782 A | 6/2000 | Rabin | |
| 6,246,987 B1 | 6/2001 | Fisher et al. | |
| 6,297,819 B1 | 10/2001 | Furst | |
| 6,373,746 B1 | 4/2002 | Takeuchi et al. | |
| 6,393,403 B1 | 5/2002 | Majaniemi | |
| 6,456,528 B1 | 9/2002 | Chen | |
| 6,510,415 B1 | 1/2003 | Talmor et al. | |
| 6,519,479 B1 | 2/2003 | Garudadri et al. | |
| 6,522,580 B2 | 2/2003 | Chen et al. | |
| 6,640,145 B2 * | 10/2003 | Hoffberg et al. | 700/83 |
| 6,643,188 B2 | 11/2003 | Tanaka et al. | |

(Continued)

FOREIGN PATENT DOCUMENTS

EP    1014338    6/2000

(Continued)

OTHER PUBLICATIONS

Barzilay, Z., et al, 'Voice Biometrics as a Natural and Cost-Effective Method of Authentication', CellMax Systems Ltd., 2007, entire document, http://www.connectionsmagazine.com/papers/7/15.pdf.*

(Continued)

*Primary Examiner* — Edan Orgad
*Assistant Examiner* — Ronald Baum
(74) *Attorney, Agent, or Firm* — Jenkins, Wilson, Taylor & Hunt, P.A.

(57) ABSTRACT

A portable memory storage device ("device") is provided. The device includes a microphone for receiving a user voice input; a controller that receives the voice input and creates a template; and a plurality of non-volatile memory cells for storing the template, wherein the template is used to authenticate the user for any subsequent user request for accessing the device and an application is launched when the device interfaces with a host system to enroll the user as an authorized user to access device functionality and/or access host system functionality.

26 Claims, 12 Drawing Sheets

U.S. PATENT DOCUMENTS

| | | | |
|---|---|---|---|
| 6,643,620 | B1 | 11/2003 | Contolini et al. |
| 6,651,168 | B1 | 11/2003 | Kao et al. |
| 6,691,196 | B2 | 2/2004 | Mills et al. |
| 6,771,536 | B2 | 8/2004 | Li et al. |
| 6,781,877 | B2 | 8/2004 | Cernea et al. |
| 6,816,837 | B1 | 11/2004 | Davis |
| 6,863,557 | B2 | 3/2005 | Mills et al. |
| 6,945,870 | B2 * | 9/2005 | Gatto et al. ............... 463/29 |
| 6,976,111 | B1 | 12/2005 | Mills et al. |
| 7,080,014 | B2 | 7/2006 | Bush et al. |
| 7,093,129 | B1 | 8/2006 | Gavagni et al. |
| 7,185,197 | B2 | 2/2007 | Wrench, Jr. |
| 7,343,439 | B2 | 3/2008 | Mills et al. |
| 7,373,656 | B2 | 5/2008 | Lang et al. |
| 2002/0078367 | A1 | 6/2002 | Lang et al. |
| 2002/0104025 | A1 | 8/2002 | Wrench, Jr. |
| 2003/0027631 | A1 * | 2/2003 | Hedrick et al. .......... 463/29 |
| 2003/0046554 | A1 | 3/2003 | Leydier et al. |
| 2003/0083881 | A1 | 5/2003 | Liu |
| 2003/0147278 | A1 | 8/2003 | Tanaka et al. |
| 2003/0218064 | A1 * | 11/2003 | Conner et al. ............ 235/439 |
| 2003/0236980 | A1 | 12/2003 | Hsu |
| 2004/0025031 | A1 * | 2/2004 | Ooi et al. ............... 713/186 |
| 2004/0054538 | A1 | 3/2004 | Kotsinadelis |
| 2005/0015540 | A1 | 1/2005 | Tsai et al. |
| 2005/0083741 | A1 | 4/2005 | Chang et al. |
| 2005/0096098 | A1 | 5/2005 | Woods |
| 2005/0240778 | A1 * | 10/2005 | Saito ...................... 713/186 |
| 2006/0021057 | A1 * | 1/2006 | Risan et al. ............... 726/26 |
| 2006/0156415 | A1 | 7/2006 | Rubinstein et al. |
| 2006/0206339 | A1 | 9/2006 | Silvera et al. |
| 2007/0143111 | A1 | 6/2007 | Conley |
| 2007/0143117 | A1 | 6/2007 | Conley |
| 2007/0143533 | A1 | 6/2007 | Conley |
| 2008/0082332 | A1 | 4/2008 | Mallett et al. |
| 2008/0243281 | A1 | 10/2008 | Kadaba et al. |

FOREIGN PATENT DOCUMENTS

| | | |
|---|---|---|
| EP | 1073037 | 3/2001 |
| EP | 1220518 | 7/2002 |
| TW | 200426702 | 12/2004 |
| WO | WO-01/02949 | 1/2001 |
| WO | WO 2007/079357 A2 | 7/2007 |

OTHER PUBLICATIONS

Official Action for U.S. Appl. No. 11/314,476 (May 22, 2008).
Official Action for U.S. Appl. No. 11/313,841 (May 15, 2008).
Jean Kumagi, "Talk to the Machine," IEEE Spectrum, pp. 60-64 (Sep. 2002).
Notification of Transmittal of the International Search Report and the Written Opinion of the International Searching Authority, or the Declaration for International Application No. PCT/US06/62342 (Oct. 3, 2008).
"Cellular Phone With Integrated MP3 Player", Research Disclosure, Mason Publications, Hampshire, GB, vol. 418, No. 15, Ericsson Inc.,(Feb. 1999),XP007123891.
International Search Report on related PCT application (PCT/US2006/062336) from International Searching Authority (EPO) dated Oct. 8, 2007.
Written Opinion on related PCT application (PCT/US2006/0062336) from International Searching Authority (EPO) dated Oct. 8, 2007.
Final Official Action for U.S. Appl. No. 11/313,841 (Feb. 5, 2009).
Final Official Action for U.S. Appl. No. 11/314,476 (Jan. 26, 2009).
Notification of Transmittal of the International Search Report and the Written Opinion of the International Seraching Authority, or the Declaration for International Application No. PCT/US06/62336 (Aug. 5, 2008).
Interview Summary for U.S. Appl. No. 11/313,841 (Oct. 19, 2009).
"U3 Platform 1.0 SDK, Application Deployment Guide," Version 1.0, Revision 4.0 (Sep. 2005).
Official Action for U.S. Appl. No. 11/314,476 (Jun. 9, 2009).
Official Action for U.S. Appl. No. 11/313,841 (Jun. 8, 2009).
Official Action for U.S. Appl. No. 11/314,933 (May 4, 2009).
Interview Summary for U.S. Appl. No. 11/314,933 (Aug. 25, 2010).
Interview Summary for U.S. Appl. No. 11/313,841 (Jul. 16, 2010).
Taiwanese Official Action for Taiwanese Application No. 095148072 (Jun. 8, 2010).
"User's Guide," GnokiiWiki, p. 1-6 (Publication Date Unknown).
"Commands," GnokiiWiki, p. 1-3 (Publication Date Unknown).
Taiwanese Official Action for Taiwanese Application No. 095148074 (Apr. 13, 2010).
Advisory Action for U.S. Appl. No. 11/314,476 (May 6, 2010).
Interview Summary for U.S. Appl. No. 11/314,476 (May 3, 2010).
Final Official Action for U.S. Appl. No. 11/313,841 (Mar. 3, 2010).
Final Official Action for U.S. Appl. No. 11/314,933 (Feb. 5, 2010).
Final Official Action for U.S. Appl. No. 11/314,476 (Jan. 20, 2010).
Notice of Allowance for Taiwanese Patent Application No. 095148074 (Oct. 29, 2010).
Official Action for U.S. Appl. No. 11/314,476 (Oct. 28, 2010).
Official Action for U.S. Appl. No. 11/313,841 (Oct. 26, 2010).

* cited by examiner

VOICE CONTROLLED PORTABLE MEMORY STORAGE DEVICE

CROSS REFERENCE TO RELATED APPLICATIONS

This patent application is related to the following applications, the disclosure of which is incorporated herein by reference in its entirety:

Ser. No. 11/314,476, filed on even data herewith, entitled "VOICE CONTROLLED PORTABLE MEMORY STORAGE DEVICE";

Ser. No. 11/313,841, filed on even data herewith, entitled "VOICE CONTROLLED PORTABLE MEMORY STORAGE DEVICE"; and Ser. No. 11/314,933, filed on even data herewith, entitled "VOICE CONTROLLED PORTABLE MEMORY STORAGE DEVICE".

BACKGROUND OF THE INVENTION

1. Field of the Invention

The present invention relates to portable devices, and more particularly, to voice activated and controlled, portable non-volatile memory storage devices.

2. Background

Non-volatile semiconductor memory devices, such as flash memory storage drives are commonly used to store digital information in various applications, for example, digital cameras, cell phones, MP3 or other audio/video players, notebook computers, desktop computers and other applications. These memory devices are small, portable, and reliable with a large capacity to store data. The memory devices can be connected to the foregoing using standard interfaces, for example, the Universal Serial Bus (USB) port or an IEEE 1394 ("Firewire") port.

The rapid popularity of flash memory devices also poses security risks and challenges. Access to stored data and to device functionality needs to be authorized and secure.

One common way to control access to such devices has been via a traditional password and a PIN (personal identification information). The password/PIN solution is not very effective, because the password can be hacked and/or forgotten.

Another solution has been to use biometric parameters, like, fingerprints, to control access to such devices. The biometric solution has shortcomings as well. For example, fingerprints can change over time or become unrecognizable. Also, fingerprint sensors are complex, sometimes unreliable, and expensive.

Portable devices (for example, an MP3 player or any other type of audio/video player) also use different buttons to control various functions. For example, portable audio/video players use plural buttons for recording, playback and other functions. These buttons are expensive and occupy real estate on portable devices that are small in size to begin with. The buttons are inconvenient to use, for example, at night or while exercising.

Therefore, there is a need for a portable device that can efficiently provide secured access to a user; and also minimizes the use of buttons.

SUMMARY OF THE INVENTION

In one aspect of the present invention, a portable memory storage device ("device") is provided. The device includes a microphone for receiving a user voice input; a controller that receives the voice input and creates a template; and a plurality of non-volatile memory cells for storing the template, wherein the template is used to authenticate the user for any subsequent user request for accessing the device and an application is launched when the device interfaces with a host system to enroll the user as an authorized user to access device functionality and/or access host system functionality.

In another aspect of the present invention a system for providing access to a host system functionality and/or portable memory storage device ("device") functionality is provided. The system includes a processor for the host system; and the device comprising: a microphone for receiving a user voice input; a controller that receives the voice input and creates a template; and a plurality of non-volatile memory cells for storing the template, wherein the template is used to authenticate the user for any subsequent user request for accessing the device, and an application is launched when the device interfaces with the host system to enroll the user as an authorized user to access device functionality and/or access host system functionality.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a computing system/portable non-volatile memory storage device will first be described. The specific architecture and operation of the preferred embodiment will then be described with reference to the general architecture.

Computing System/Portable Memory Device

Figure 1A:
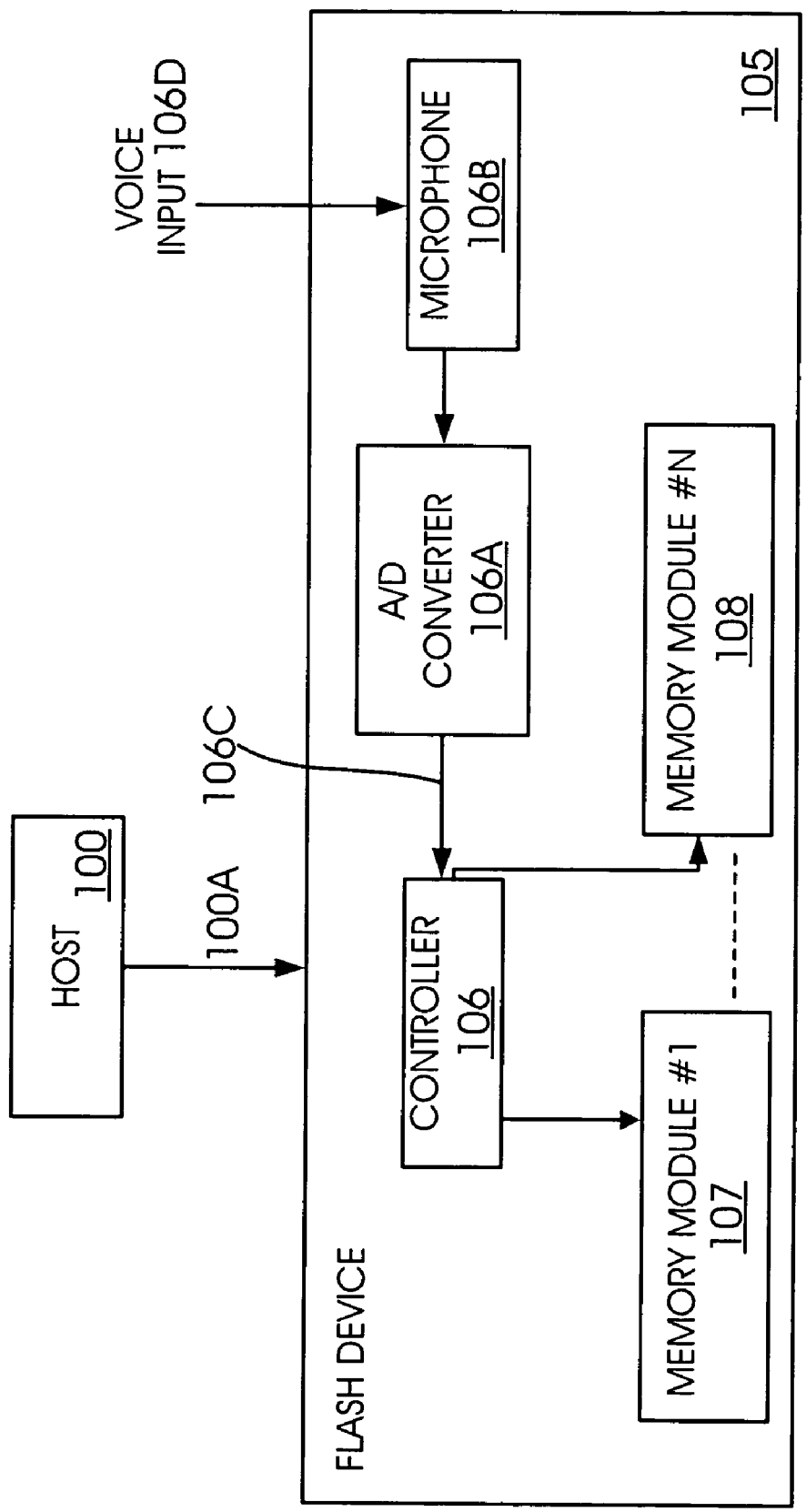
FIG. 1A shows a top-level block diagram of a portable memory device coupled to a host system, according to one aspect of the present invention.

FIG. 1A shows a functional block diagram of a portable memory device (may also be referred to as a "flash device" or "flash memory device") 105 coupled to a host device (or system, used interchangeably) 100 via a bus 100A. The term portable memory device as used throughout this specification is intended to include a portable flash drive, a portable audio/video player (including an MP3 player) and other similar devices.

A microphone 106B is provided to capture a user's voice (shown as input 106D) that is then sent to an analog/digital (A/D) converter 106A. A digital signal 106C is received and processed by controller 106 (may also be referred to as "memory controller" or "controller"), as described below. Controller 106 interfaces with host system 100 via a bus interface 100A.

It is noteworthy that controller 106 may be a part of an integrated circuit (for example, an application specific integrated circuit (ASIC)) or any other circuit.

Flash memory device 105 includes solid-state memory modules/cells 107-108 (shown as Memory Module #1 and Memory Module #N). Memory cells 107/108 are used to store data, applications and other information.

There are currently many different types of flash memory cards that are commercially available, examples being the CompactFlash (CF), the MultiMediaCard (MMC), Secure Digital (SD), miniSD, Memory Stick, SmartMedia and TransFlash cards. Although each of these cards has a unique mechanical and/or electrical interface according to its standardized specifications (for example, The Universal Serial Bus (USB) specification, incorporated herein by reference in its entirety), the flash memory included in each is very similar. These cards are all available from SanDisk Corporation, assignee of the present application.

SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host devices (for example, 100) that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged.

A NAND architecture of the memory cell arrays 107-108 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278.

Figure 1B:
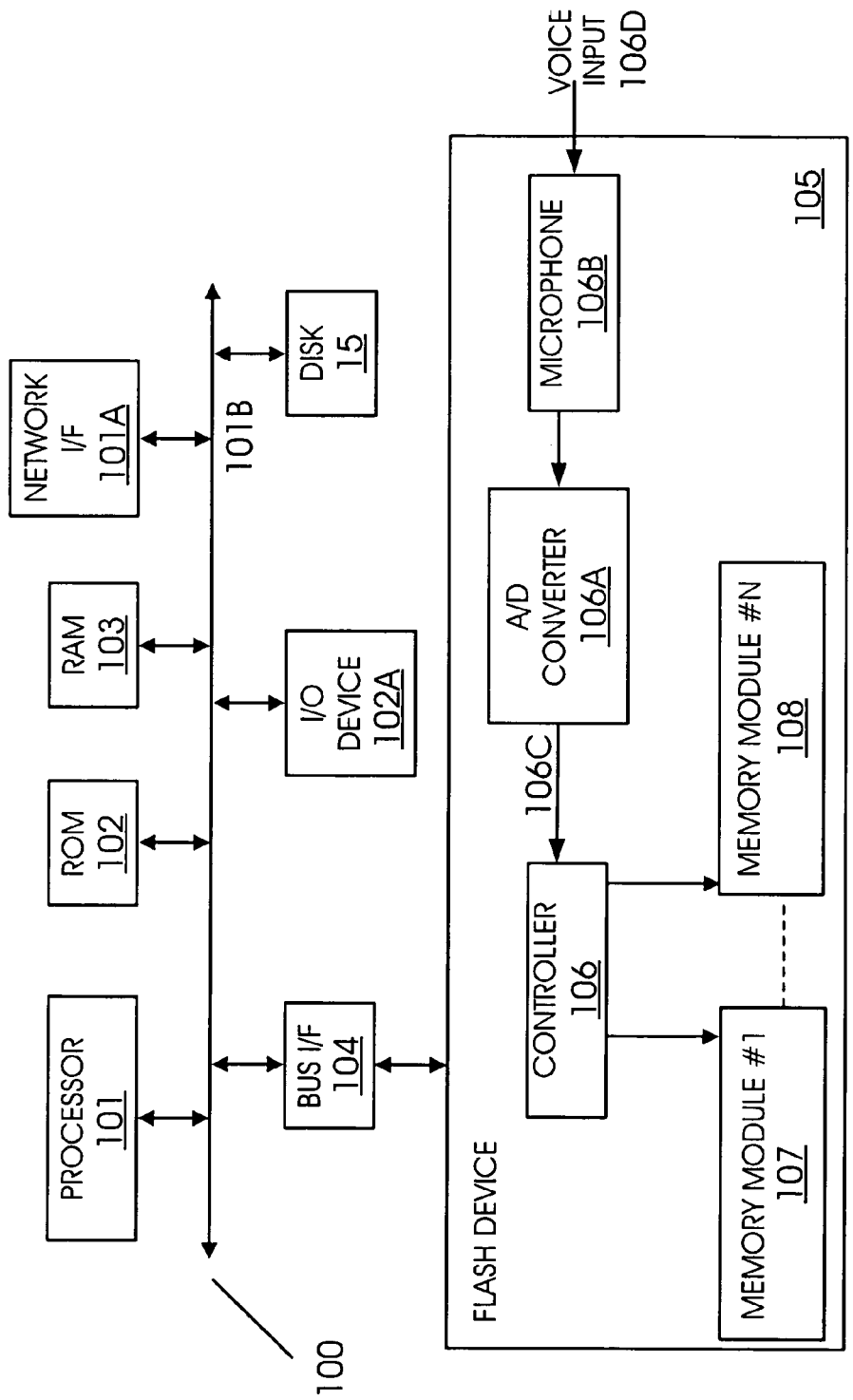
FIG. 1B shows a block diagram of the internal architecture of the host system in FIG. 1A.

FIG. 1B shows a block diagram of a typical host system 100 that includes a central processing unit ("CPU") (or microprocessor) 101 connected to a system bus 101B. Host system 100 is coupled with flash device 105 via a bus interface 104.

Random access main memory ("RAM") 103 is coupled to system bus 101B and provides CPU 101 with access to memory storage. When executing program instructions, CPU 101 stores those process steps in RAM 103 and executes the stored process steps out of RAM 103.

Host system 100 connects to a computer network (not shown) via network interface 101A (and through a network connection (not shown)). One such network is the Internet that allows host system 100 to download applications, code, documents and others electronic information.

Read only memory ("ROM") 102 is provided to store invariant instruction sequences such as start-up instruction sequences or basic Input/output operating system (BIOS) sequences.

Input/Output ("I/O") device interface 102A allows host 100 to connect to various input/out devices, for example, a keyboard, a pointing device ("mouse"), a monitor, printer, a modem and the like. I/O device interface 102A is shown as a single block for simplicity and may include plural interfaces to interface with different types of I/O devices.

Figure 1C:
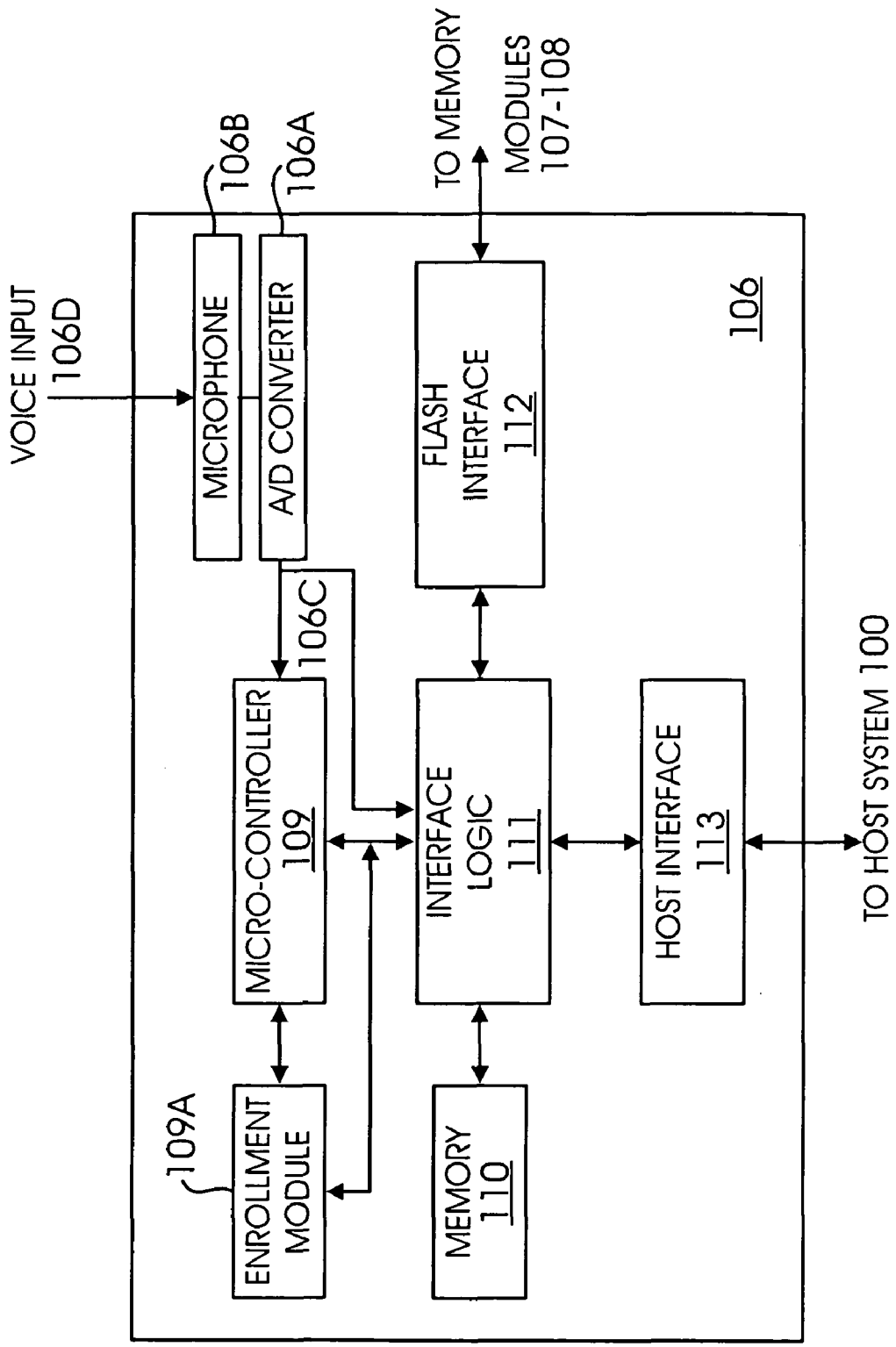
FIG. 1C shows a block diagram of a memory controller in FIG. 1A, according to one aspect of the present invention.

FIG. 1C shows a block diagram of the internal architecture of controller module 106. Controller module 106 includes a microcontroller 109 that interfaces with various other components via interface logic 111. Memory 110 stores firmware and software instructions that are used by microcontroller 109 to control the operation of flash device 105. Memory 110 may be volatile re-programmable random access memory ("RAM"), a non-volatile memory that is not re-programmable ("ROM"), a one-time programmable memory or a re-programmable flash electrically-erasable and programmable read-only memory ("EEPROM").

A host interface 113 interfaces with host system 100, while a flash interface 112 interfaces with memory modules 107-108.

Microphone 106B is used to capture user voice input (106D). The analog voice data is then converted into digital data by A/D converter 106A and the digital signal 106C is then processed by microcontroller 109. It is noteworthy that digital signal may be accessed by microcontroller 109 via interface logic 111.

Enrollment module 109A is provided so that a user can trigger the enrollment process, described below, according to one aspect of the present invention. In one aspect, enrollment module includes a "button" or a physical interface that the user activates to start the enrollment process, according to one aspect of the present invention.

Figure 1D:
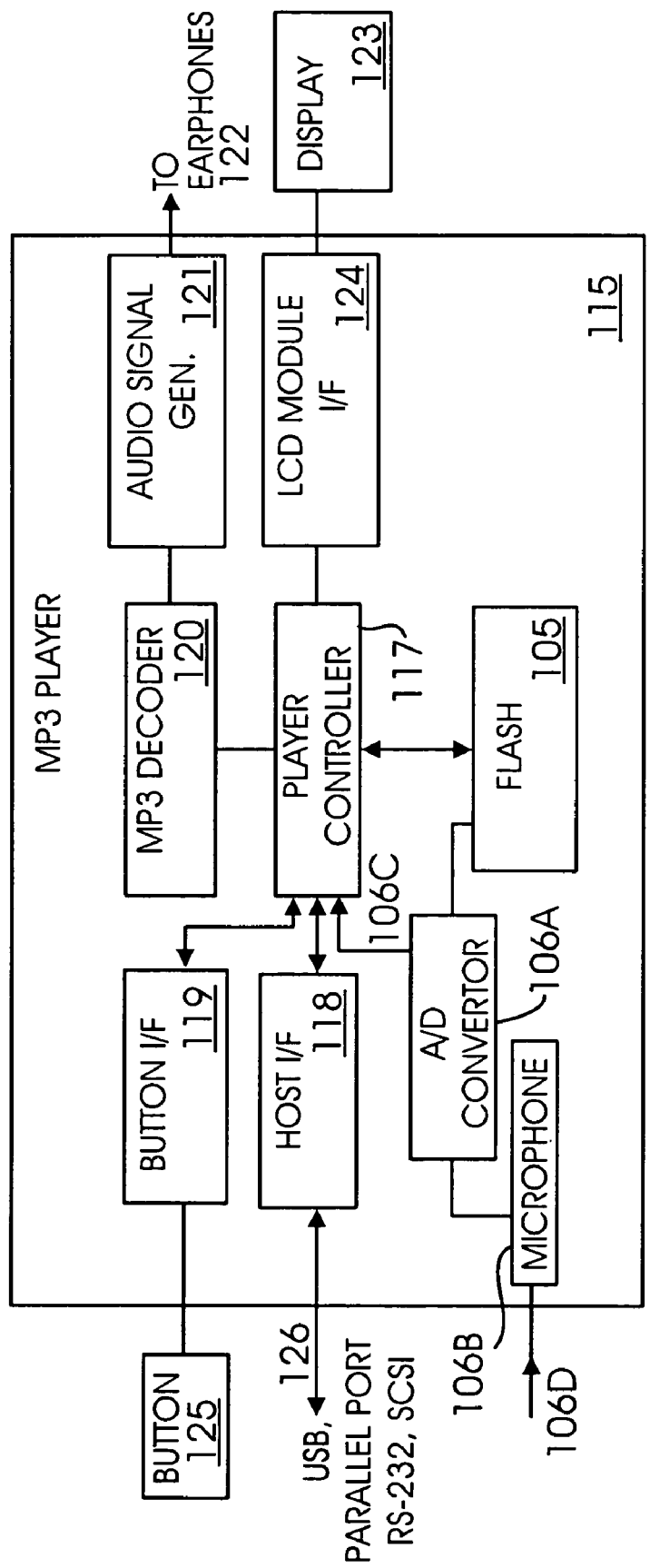
FIG. 1D shows a top-level block diagram of an audio/video player with voice control, according to one aspect of the present invention.

FIG. 1D shows another example of a portable device that is voice controlled, according to one aspect of the present invention. Portable device in FIG. 1D is an audio/video player 115 (may be referred to as Player 115) that can play an audio file (for example, an MP3 file) stored in memory cells 107/108.

Flash device 105 in this aspect is a part of Player 115. Player 115 is also capable of playing a video file or displaying an image.

It is noteworthy that the present invention is not limited to any particular audio/video file format.

Player 115 includes a player controller 117 that controls overall functionality. Player controller 117 interfaces with a display module 123 via a LCD module I/F 124 to display information to a user. Typically, the information relates to the music that is being played.

Player controller 117 also interfaces with a host system via a host interface 118 via port 126. Port 126 may be USB, parallel port, RS232, SCSI or any other type of port.

Decoder 120 decodes audio files and sends the decoded signal to an audio signal generator 121. The audio signal generator outputs the audio, for example, to ear phones 122.

Player 115 also includes a button interface 119 that receives input from button 125. To request certain functionality the user uses Button 125. It is noteworthy that block 125 is intended to simply provide an example and is not intended to limit the present invention to any particular number/type of buttons or physical interface that is used by the user to request functionality. Button 125 can be used by the user to begin the enrollment/training process, according to one aspect of the present invention, as described below in detail.

Figure 1E:
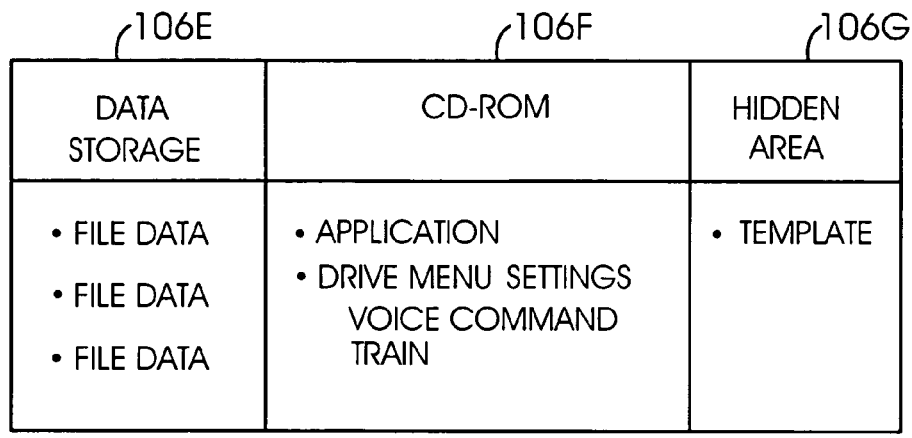
FIG. 1E shows an example of storing information in non-volatile memory cells, according to one aspect of the present invention.

FIG. 1E shows a block diagram for flash device 105 that interfaces with host system 100 via a USB interface. Flash device 105 conforms to the USB specification (i.e. can be accessed via a USB interface) and appears to host 100 having plural Logical Units (LUNs) of storage space and each LUN may appear to be of a different class of storage device. For example, flash device 105 may appear to have both a standard Mass Storage Class volume (LUN 0, 106E), which imitates the behavior of a SCSI Hard Disk Drive, and a MMC Class volume, which imitates the behavior of a CD-ROM (LUN 1, 106F).

Host system 100 having its own operating system views LUN 0 (106E) as a mass storage device for storing data and other information; and LUN 1 106F as a CD-ROM that can store an auto-run application code for launching an application. Hidden area 106G is secured and may be used to store a voice print template, as discussed below.

Figure 2:
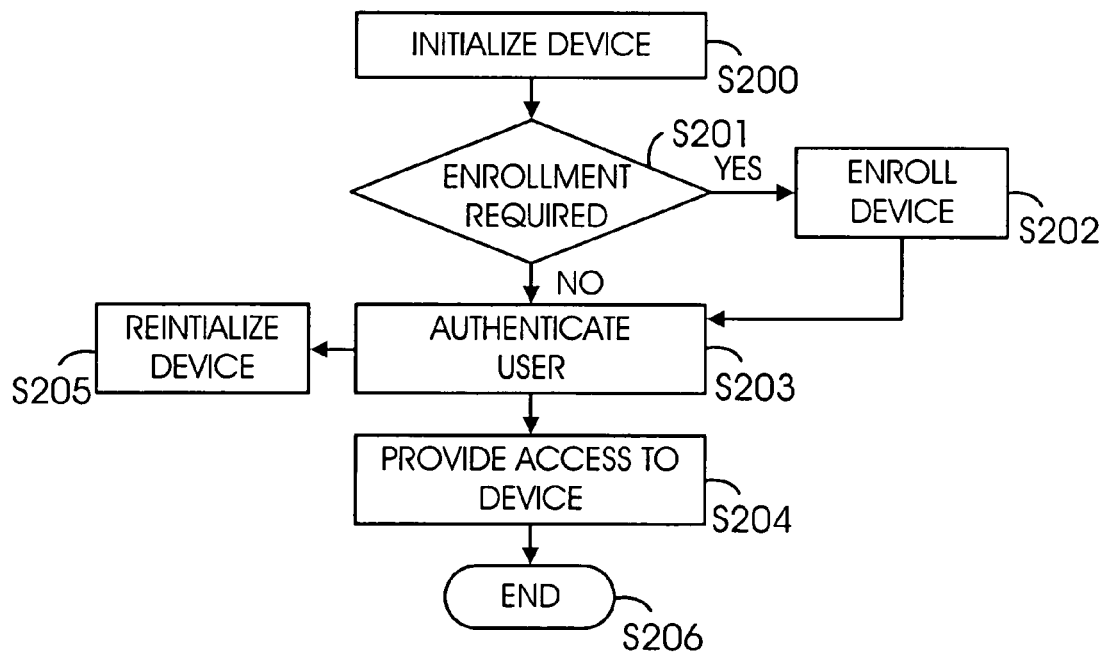
FIG. 2 shows a process flow diagram for using a voice controlled portable memory device, according to one aspect of the present invention.

Process Flow:

FIG. 2 shows a top-level flow diagram for using a flash device 105 (or Player 115, used interchangeably through out this specification and may also be referred to as a "device"), according to one aspect of the present invention. Flash device 105 is initialized in step S200. In step S201, the process determines if the device needs to be enrolled. If enrollment is needed, then the process moves to step S202, described below in detail with respect to FIG. 3.

If enrollment is not needed, then the user is authenticated in step S203, described below with respect to FIG. 4. After authentication, in step S204, the user is granted access to the device, described below in detail with respect FIG. 5.

If the user cannot be authenticated in step S203, then the device is re-initialized in step S205, described below with respect to FIG. 6. The process ends in step S206.

Enrollment:

The enrollment process captures a user's voice input 106D and stores it in flash memory cells 107/108 (preferably in a secured hidden area, for example, 106G, FIG. 1E), according to one aspect of the present invention. A device user may be asked to repeat a password/phrase more than once to capture an accurate voice print profile in flash device 105. Multiple password phrases may be stored allowing more than one user to access flash device 105 or if a user is concerned about remembering a specific phrase, according to one aspect of the present invention. Controller 106 receives the voice input (106D) and stores it as a template in memory cells 107/108.

Figure 3A:
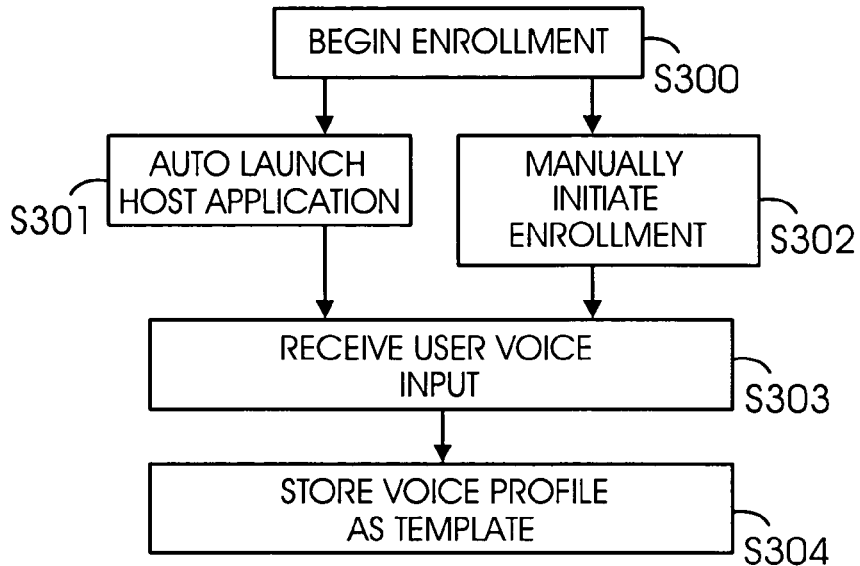
FIG. 3A shows a process flow diagram for performing enrollment of a portable memory device, according to one aspect of the present invention.

Turning now in detail to FIG. 3A, the enrollment process begins in step S300. The enrollment process can be performed in two ways: An application (FIG. 1E) is launched (in step S301) when flash device 105 interfaces with a host system (or when Player 115 is powered on for use for the first time).

Enrollment can also be initiated manually, as shown in step S302. In this case a user manually launches an application by selecting an application shown in FIG. 1E or by pressing a button (125, as shown in FIG. 1D).

The application prompts the user to repeat a phrase and in step S303, the user voice input is received by flash device 105. In step S304, the voice input is stored in non-volatile memory cells 107/108. Controller 106 stores the voice input. The voice input is stored as template that is used in subsequent authentication when a user wants to access flash device 105 functionality. In one aspect, controller 106 stores and maintains the template.

Figure 3B:
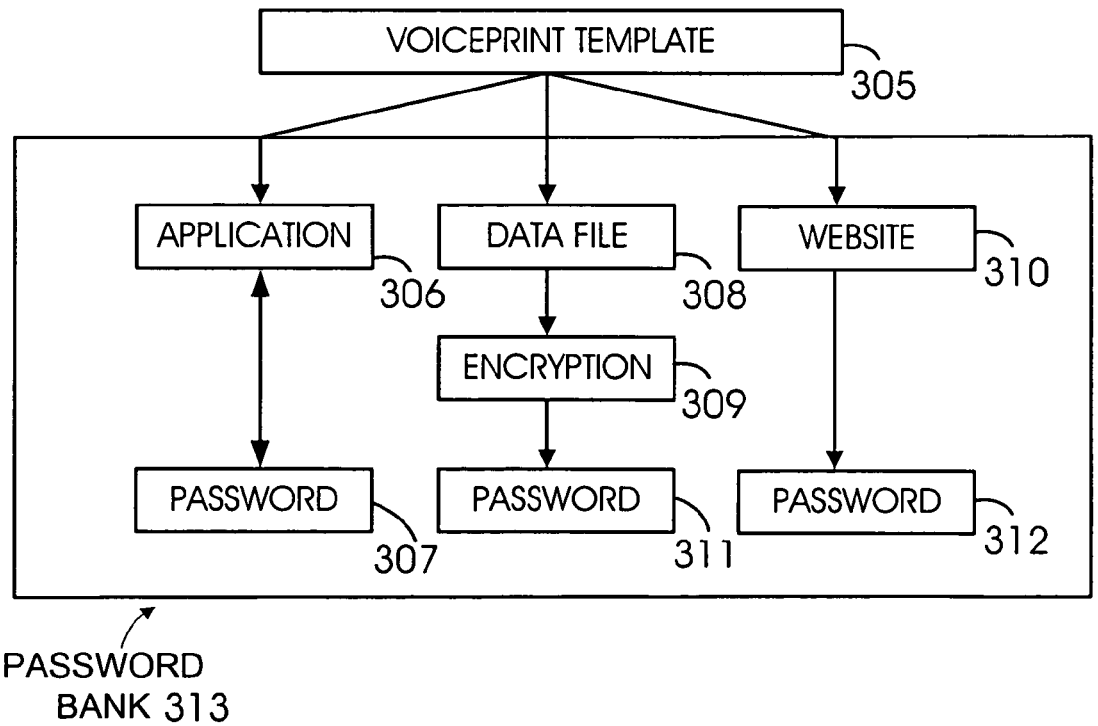
FIG. 3B shows an example of a voice print created according to one aspect of the present invention.

FIG. 3B shows an example of a voice template (is also referred to as a "template") 305. Template 305 is used to authenticate a user's request to access flash device 105. Separate templates can be stored so that multiple users can securely use flash device 105.

Template 305 is also associated with other passwords (referred to as a password bank 313). For example, a user may store a password 307 that allows the user to access and use application 306. Password 307 is associated with template 305. It is noteworthy that a password similar to 307 may also be used to access a host system 100 or to connect to a network via network interface 101A.

A data file 308 (that may be protected by encryption 309) can be protected by a voice-based password 311. Password 311 is also associated with template 305.

Password 312 used by a user to access a web site 310 (for example, an online banking website) can also be associated with template 305. When the user wants to access website 310, password 312 is automatically filled in because it is linked to template 305.

The password bank features are further described in detail below.

Authentication:

When flash device 105 has been secured through the enrollment process, secured authentication is used to allow access to a user. The level of access will depend on the stored passwords.

Figure 4:
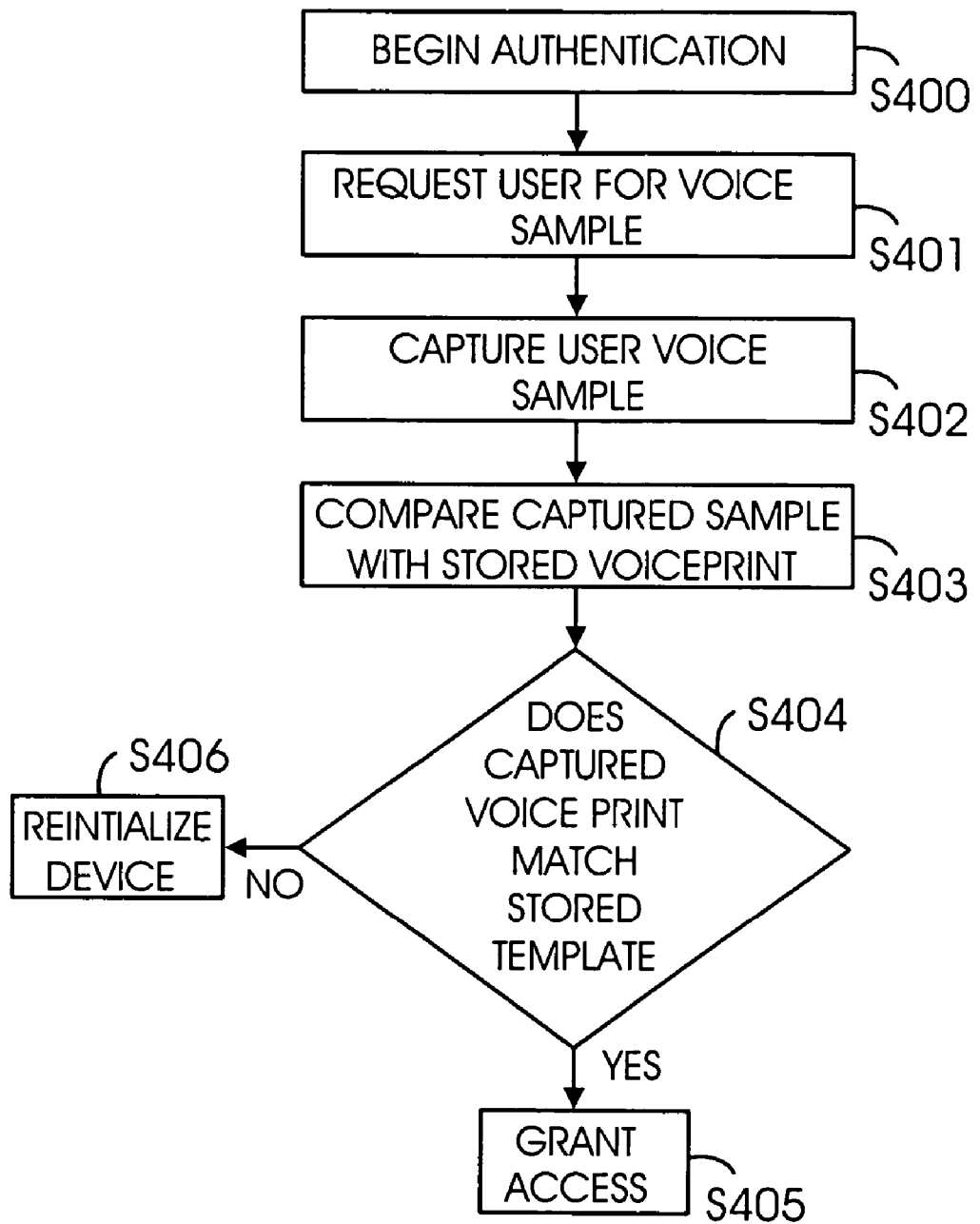
FIG. 4 shows a process flow diagram for authenticating a portable memory device, according to one aspect of the present invention.

Turning in detail to FIG. 4, the authentication process begins in step S400. This may occur when flash device 105 interfaces with a host system (or when Player 115 is powered up) and an application is launched. In step S401, the user is requested for a voice input sample. In step S402, the user voice input 106D is captured by the microphone 106B and converted into a digital signal by an A/D converter 106A.

In step S403, the captured voice sample is compared to a voice template stored in flash memory cells 107/108 (for example, 305).

In step S404, flash device microcontroller 109 determines if the voice input matches with stored voice templates. The comparison is performed on the flash device 105 for security reasons. However, a software module (not shown) running on the host system; and/or a hardware circuit (e.g. an ASIC) can be used to perform the comparison.

If the user input matches with the stored template then the user is granted access to flash device 105 in Step S405. In one aspect, the level of access may depend on the type of user. For example, certain users may be granted only "read-only" privilege, i.e., the user can only view information and is not allowed to modify stored content, while others are allowed to read and write. This level is set during enrollment.

If the user cannot be authenticated, then the user is given an option in Step S406 to re-initialize flash device 105 as discussed below in FIG. 6.

Figure 5:
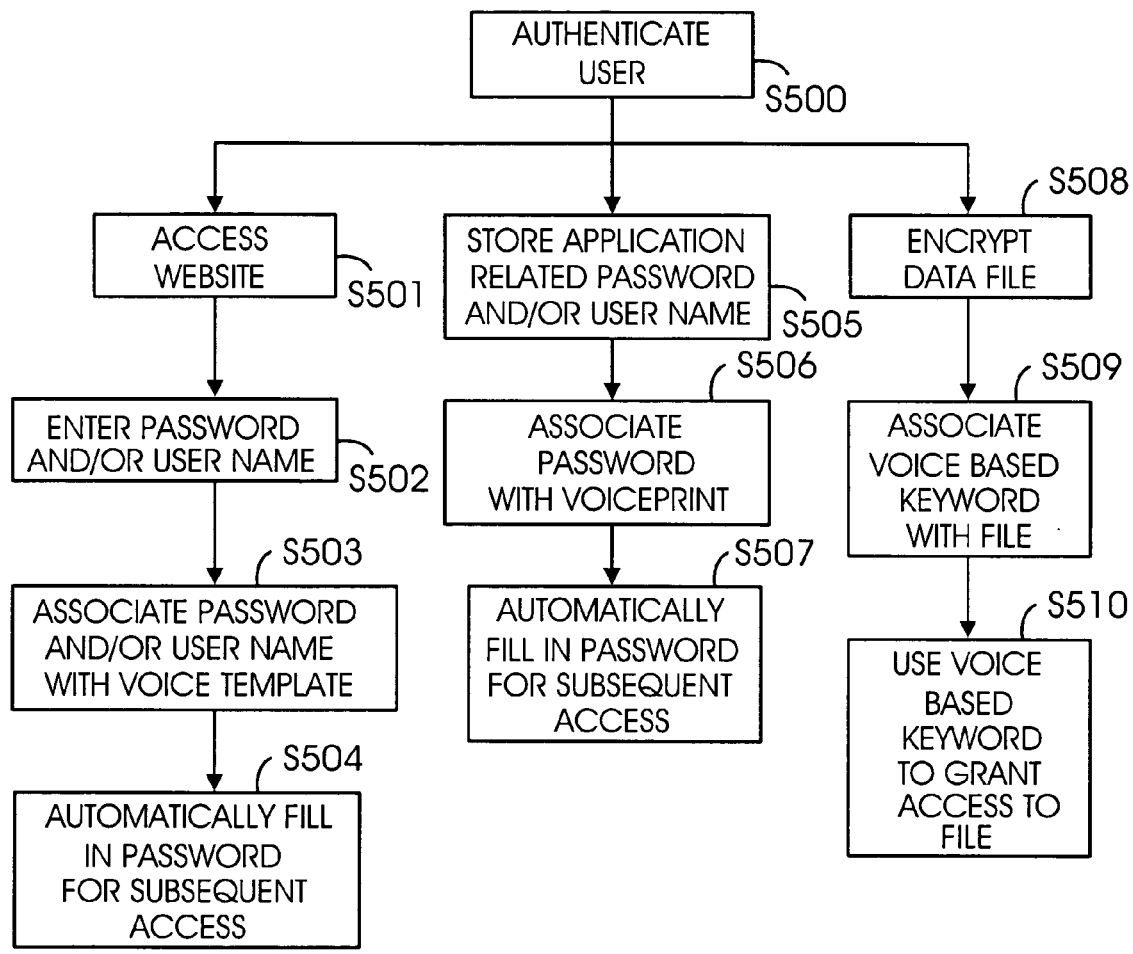
FIG. 5 shows a process flow diagram for creating a password bank, according to one aspect of the present invention.

Password Bank/Application Access/File Access:

FIG. 5 shows various examples of using flash device 105 with template 305. The user is first authenticated in step S500, as described above with respect to FIG. 4.

Steps S501-S504 relate to websites, steps S505-S507 relate to applications and steps S508-S510 relate to files.

In step S501, the user accesses a website (for example, 310) using a computing system that interfaces with flash device 105.

In step S502, the user enters a password and user name to control access to the website. In step S503, the password and user name is associated with a voice-based template (for example, 305). When the user subsequently tries to access the same website, then the password and username associated with the template are filled in automatically (in S504).

It is noteworthy that if a host system stores "cookies" containing user names/passwords from previous logins then the password bank based on voice input takes precedence. Furthermore, if multiple users are enrolled for flash device 105, then passwords for different users are kept separate and access is only granted to authenticated users. If a single user has multiple passwords enrolled, then the user stores the passwords/usernames multiple times based on the number of passwords/usernames.

In step S505, a user accesses a computer application (306), for example, a Windows® based application and then protects access to the application by storing an application specific password/username (307). In step S506 the password and username are associated with template 305. In step S507, when the user subsequently wants to access the application again, the password/username is automatically retrieved because they are linked with the voice print template 305.

It is noteworthy that steps S505-S507 can be used to access a host system 100 or access a network via network interface 101A.

In step S508, a user encrypts a data file that is stored in memory cells 107/108. In step S509 a file specific voice based passphrase (keyword) is used to secure file data. The user voice input is a passphrase that is associated with a particular file/directory/sub-directory. The voice-based passphrase provides additional protection to secure data, according to one aspect of the present invention. For example, template 305 limits access to flash device 105, the encryption protects the file data at the next level, and then the voice based passphrase 310 limits access to file data in step S510.

Figure 6:
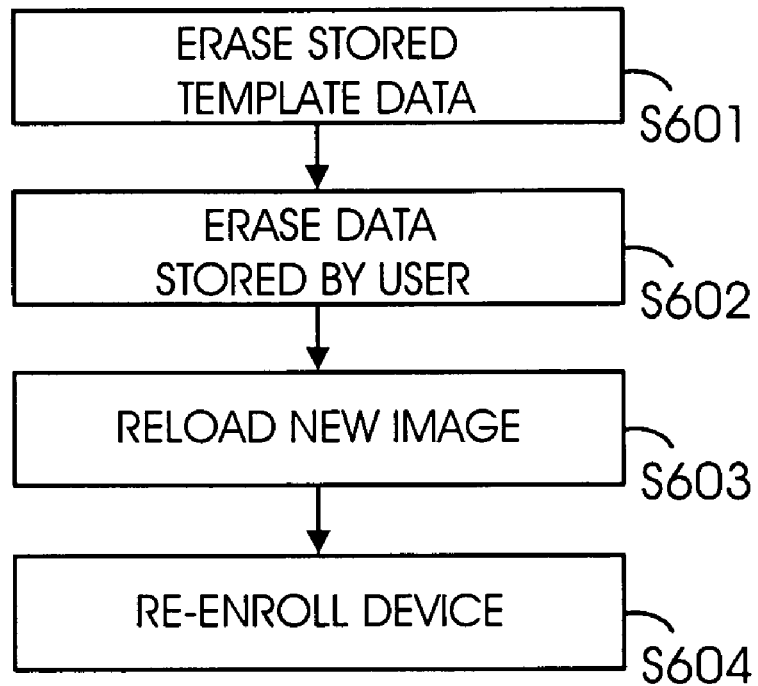
FIG. 6 shows a process flow diagram for reinitializing a portable device, according to one aspect of the present invention.

Re-Initialization:

FIG. 6 shows a block diagram for re-initializing flash device 105. In step S601, the previous voice based templates are erased. In step S602, data associated with the user may also be deleted. In one aspect, if a user is given a certain partition (segment) of storage space, then the data in that partition is also deleted.

In step S603, the user again goes through the enrollment process (i.e. a template or "new image" is reloaded) described above and the re-enrollment is completed in step S604.

Macros:

In one aspect of the present invention, a voice-based template is associated with a control button of a portable device. For example, for a Player (115), the user can record the word "play" and the keyword play is associated with the functionality of the "play" button. Hence, when the user says the word "play", Player 115 plays music/video.

The adaptive aspects of the present invention also allow a user to create "macros" for certain functions for which there are no control buttons or for which more than one button needs to be pressed. One example of such a macro is for the mute function for an audio/video player. The mute function allows a user to mute/silence the player. Typically, one either has a dedicated button or has to press more than one button to mute the player.

Device Training:

For a new portable device, the user stores activation keywords and assigns the keywords to various functions. The keywords are captured via microphone 106B and once captured, a template is created and stored in memory cells 107/108. Controller 106 saves the template. The user then captures one or more button control functions (for example, "play", rewind, fast forward, pause, and others) and the button control functions are associated with the keywords and stored in non-volatile memory cells 107/108.

It is noteworthy that instead of training the device for keywords, certain keywords can be pre-loaded in memory cells 107/108. The pre-loaded keywords are then associated with functions, as described below.

Figure 7A:
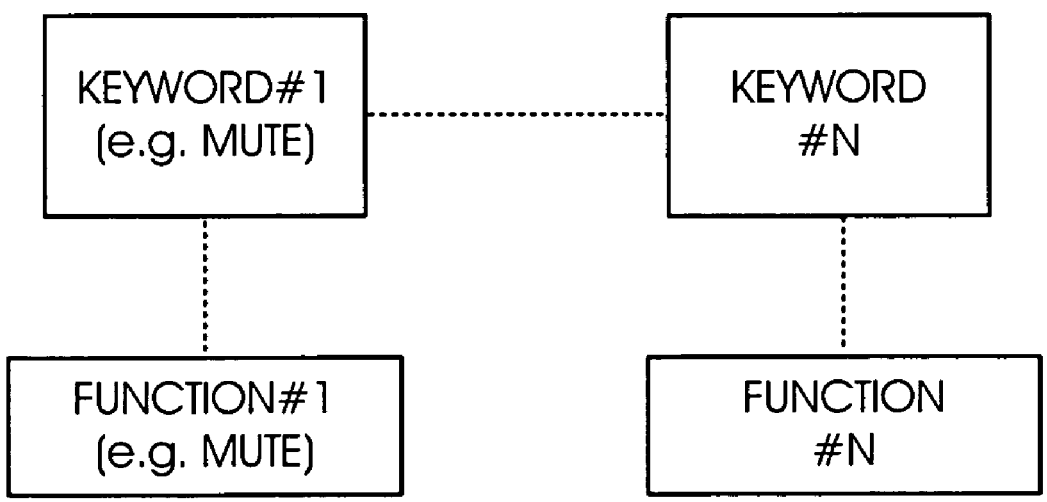
FIG. 7A shows an example for storing keywords in a portable device, according to one aspect of the present invention.

FIG. 7A shows an example of how keywords stored in memory cells are related to functions. Plural keywords (shown as 1 to N) may be stored to perform plural functions (1 to N).

Figures 7B, 8:
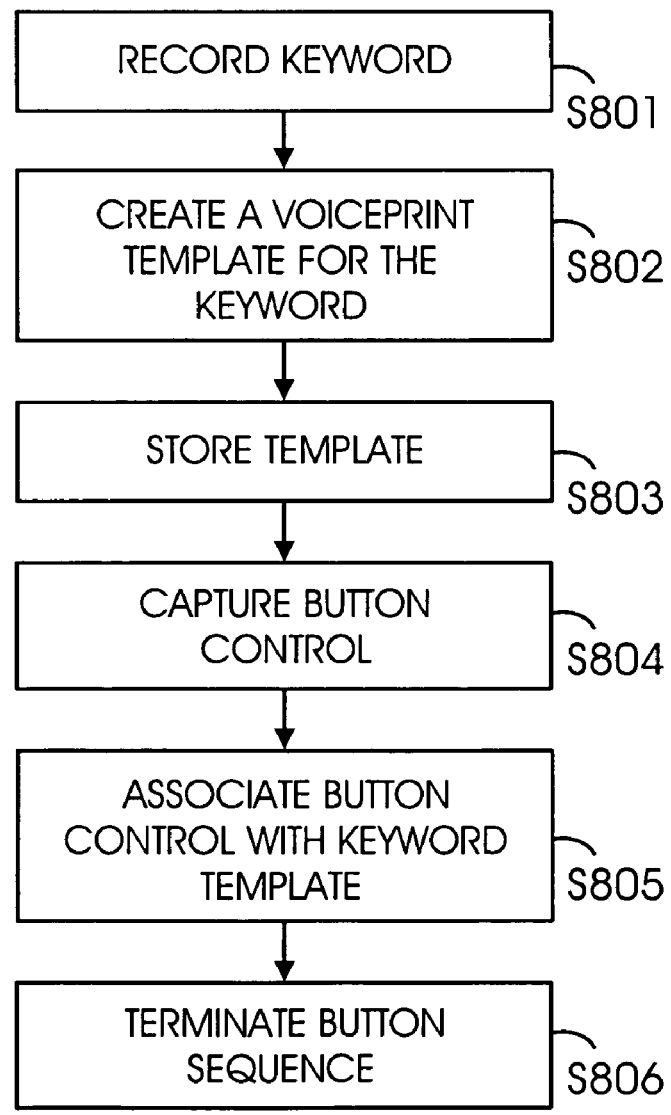
FIG. 7B shows an example of phonetic patterns associated with file names, according to one aspect of the present invention.
FIG. 8 shows a process flow diagram for creating a macro in a portable memory device, according to one aspect of the present invention.

FIG. 8 shows a process flow diagram for training and using a portable device so that device functions can be performed based on voice input. In step S801, a user records a specific keyword. The user is enrolled and authenticated by the portable device as explained above. An application is launched to train and store the keywords. As stated above, the keywords can also be pre-loaded in memory cells 107/108.

In step S802, controller 106 stores a voiceprint template for the keyword.

In step S803, the template is stored in non-volatile memory cells.

In step S804, the user captures a button control sequence for a function that the user intends to associate with the stored keyword. The button sequence can be for a function which has a dedicated button (for example, the play function), or for which a user has to perform a button sequence (for example, to achieve the mute function, in various audio/video players one has to press more than one button/key).

In step S805, the button control action is associated with the stored keyword. In one aspect, Controller 106 performs this function. In another aspect, a host processor may also perform this function.

In step S806, the user terminates the button sequence. Termination of a button sequence is signaled by an action that normally does not take place, for example, by holding a specific button for a pre-determined period.

The foregoing process steps are used to store plural keywords that are associated to plural device functions.

Figure 9:
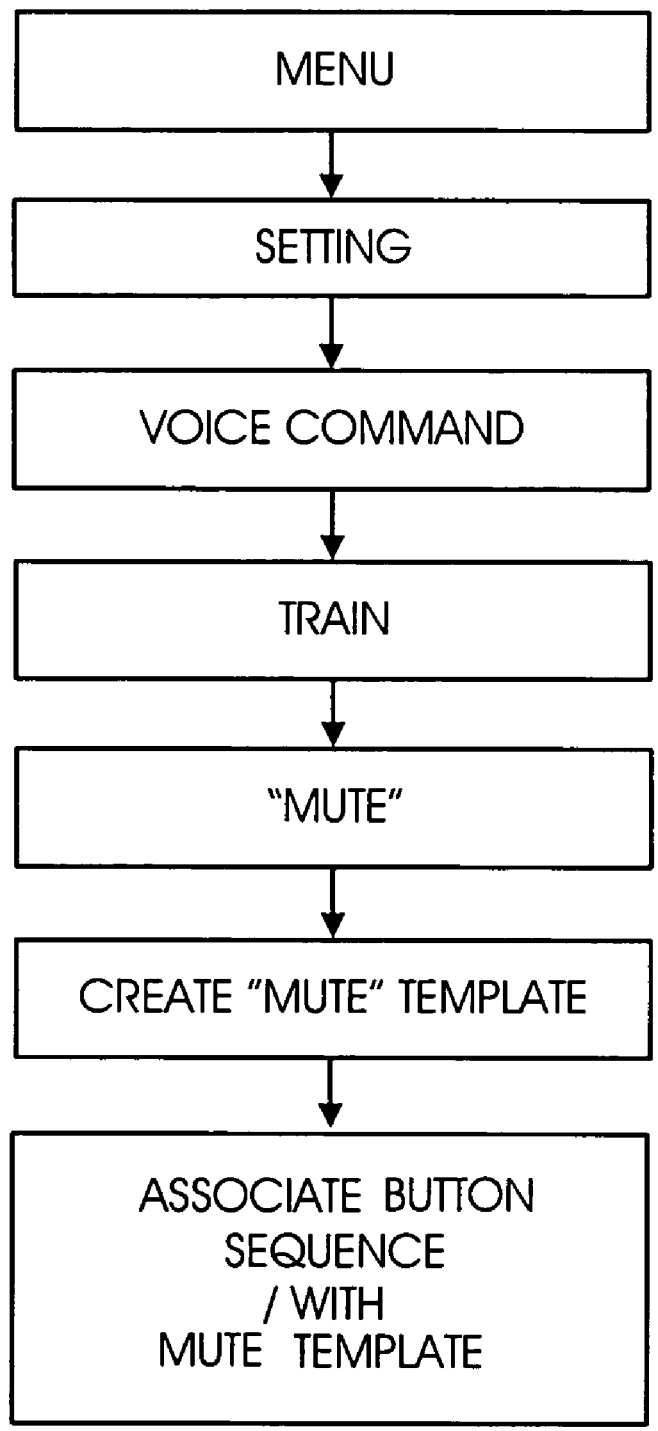
FIG. 9 shows an example of a macro, according to one aspect of the present invention.

FIG. 9 shows an example, of associating the mute function to user keyword "Mute". Each device has a "Menu" option and a user selects the "Menu" option to begin training the device. From the Menu option, the user chooses the "Setting" option. The user then selects the "Voice Command" option that allows the user to move to the Train option.

The user selects the Train option and is prompted to enter a voice command. The user says "Mute" and device 105 creates a Mute template. The user is then prompted to enter a button sequence (for example, Menu>Volume>Level 0) that can be associated with the voice command "Mute". Pressing certain buttons for certain duration (for example, the A/B repeat button for 4 seconds) terminates the sequence.

Once device 105 is trained, the spoken word can be used to activate the function for which it is programmed. For example, when the user says Mute, the device (Player 115) becomes mute.

Figure 10:
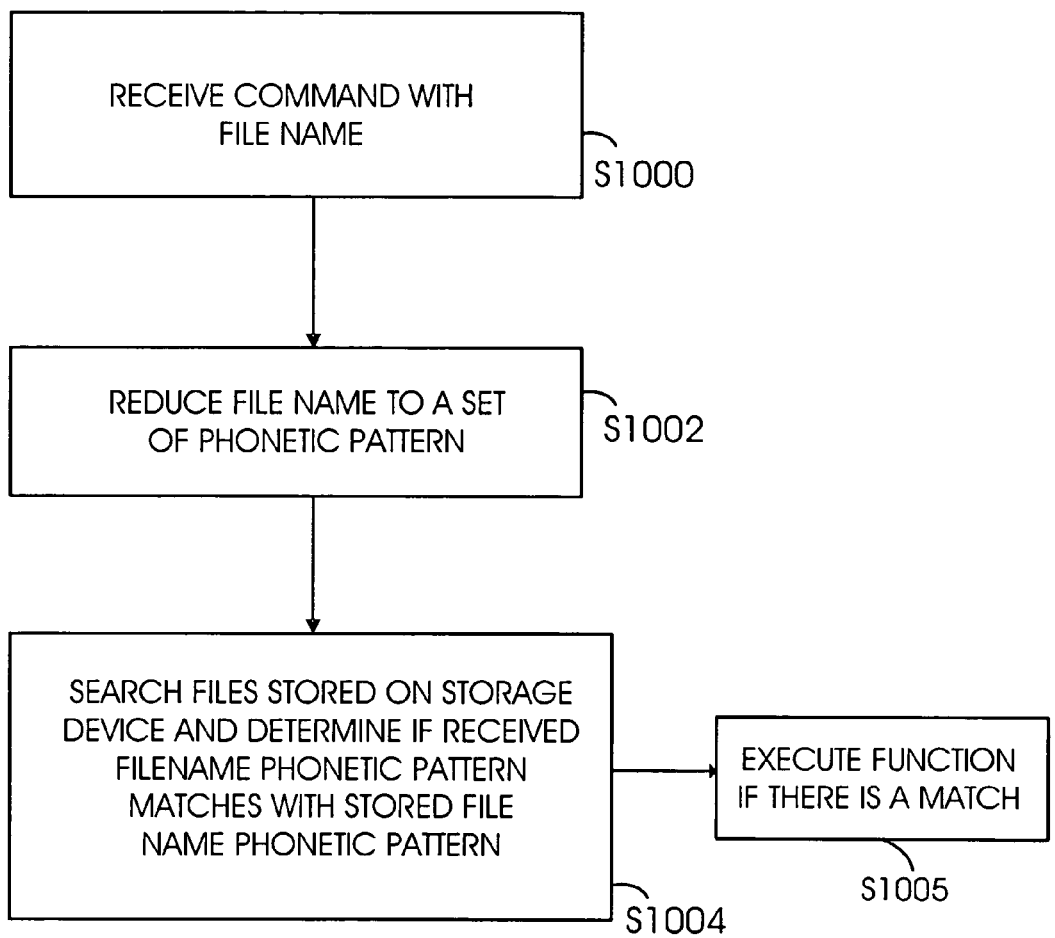
FIG. 10 shows a process flow diagram for associating a function to a file name, according to one aspect of the present invention.

FIG. 10 shows a process flow diagram for executing device 105 functions when a user states a command with a file name for a file stored in memory cells 107/108, according to one aspect of the present invention. The process begins in step S1000, when player 115 receives a voice command with a file name from a user. For example, the user states "Play Beethoven", where "play" is a command to play an audio file named "Beethoven".

In step S1002, player 115 parses the file name and creates a phonetic pattern. For example, "Beethoven" is reduced to a pattern "bee", "tho" and "ven".

In step S1004, player 115 searches plural files that are stored in a directory in memory cells 107/108 to determine if the phonetic pattern in step S1002 matches the phonetic pattern for the stored files. Player 115 creates a phonetic pattern for the stored file names either real time when it receives a command in step S1000 or maintains a list of phonetic patterns that is updated every time a file is added. The received file name phonetic pattern (for example, bee, tho, ven) is compared with the phonetic patterns of the stored files. If there is a match, the function is executed in step S1005. In this example, the file named "Beethoven" is played.

FIG. 7B shows an example of how file names with associated phonetic patterns are stored in memory cells 107/108. The files can be for audio, video or any other information.

It is noteworthy that although the foregoing example is based on playing an audio file, the adaptive aspects of the present invention are not limited to playing audio files or to any particular file type/format or to any type of command. For example, a user can command the device to "Delete XYX". The device then deletes the file XYZ after the phonetic pattern for XYZ matches with a stored file named XYZ.

In one aspect of the present invention, fewer buttons are needed to operate a device like an audio/video player (for example, an MP3 player). The user is given an option to create voice commands for standard functions as well as custom functions. The device is user friendly and cheaper because fewer buttons are needed.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A portable memory storage device ("device"), comprising:
   a microphone for receiving voice inputs from a user;
   a plurality of non-volatile memory cells; and
   a controller for receiving a user voice input, creating a template, and storing the template in the non-volatile memory cells, wherein the template is used to authenticate the user for any subsequent user request for accessing the device and an application is launched when the device interfaces with a host system to enroll the user as an authorized user to access device functionality and/or access host system functionality, wherein the portable memory storage device is a component of a portable media player, wherein the controller associates a voice command spoken by a user and a play function of the portable media player, and wherein the portable memory storage device is configured to play a media file stored in memory of the portable memory storage device in response to the portable memory storage device receiving the voice command from the user, the voice command including a file name for the media file.

2. The device of claim 1, wherein the user manually elects to enroll to access device functionality and/or access host system functionality.

3. The device of claim 1, wherein the template is associated with a password and/or username that the user uses to access a website, and the password and/or username are automatically filled when an enrolled and authenticated user subsequently attempts to access the website.

4. The device of claim 1, wherein the template is associated with a password and/or username that the user uses to access an application, and the password and/or username are automatically filled when an enrolled and authenticated user, subsequently attempts to access the application.

5. The device of claim 1, wherein the template is associated with another voice based keyword or passphrase, which is used to allow the user to access a data file.

6. The device of claim 5, wherein the data file is encrypted and stored in the non-volatile memory cells.

7. The device of claim 1, wherein the template is associated with a password and/or username that the user uses to access the host system and the password and/or username are automatically filled when an enrolled and authenticated user, subsequently attempts to access the host system.

8. The device of claim 1, wherein the template is associated with a password and/or username that the user uses to access a network and the password and/or username are automatically filled when an enrolled and authenticated user, subsequently attempts to access the network.

9. The device of claim 1, wherein plural voice inputs are stored as a template, allowing the user to store plural passwords to access the device.

10. The device of claim 1, wherein plural user voice inputs are stored in plural templates, allowing plural users to be enrolled so that the plural users can securely access the device.

11. The device of claim 1, wherein the template is stored in a secured area of the non-volatile memory cells.

12. The device of claim 1, wherein when the device interfaces with the host system, an application is launched to authenticate the user by receiving a voice input from the user and comparing the voice input with the template and after the user is authenticated, the host system is allowed access information stored in the device.

13. The device of claim 1, wherein if an unauthorized user attempts to access the device, the device is re-initialized and during re-initialization the template and any data associated with the user is erased.

14. A system for providing access to a host system functionality and/or portable memory storage device ("device") functionality, comprising:
   a processor for the host system; and
   the portable memory storage device comprising: a microphone for receiving voice inputs from a user; a plurality of non-volatile memory cells; and a controller for receiving a user voice input, creating a template, and storing the template in the non-volatile memory cells, wherein the template is used to authenticate the user for any subsequent user request for accessing the device, and an application is launched when the device interfaces with the host system to enroll the user as an authorized user to access device functionality and/or access host system functionality, wherein the portable memory storage device is a component of a portable media player, wherein the controller associates a voice command spoken by the user and a play function of the portable media player, and wherein the portable memory storage device is configured to play a media file stored in memory of the portable memory storage device in response to the portable memory storage device receiving the voice command from a user, the voice command including a file name for the media file.

15. The system of claim 14, wherein the user manually elects to enroll, to access device functionality and/or access host system functionality.

16. The system of claim 14, wherein the template is associated with a password and/or username that the user uses to access a website, and the password and/or username are automatically filled when an enrolled and authenticated user subsequently attempts to access the website.

17. The system of claim 14, wherein the template is associated with a password and/or username that the user uses to access an application, and the password and/or username are automatically filled when an enrolled and authenticated user, subsequently attempts to access the application.

18. The system of claim 14, wherein the template is associated with another voice based keyword or passphrase, which is used to allow the user to access a data file.

19. The system of claim 18, wherein the data file is encrypted and stored in the non-volatile memory cells.

20. The system of claim 14, wherein the template is associated with a password and/or username that the user uses to access the host system and the password and/or username are automatically filled when an enrolled and authenticated user, subsequently attempts to access the host system.

21. The system of claim 14, wherein the template is associated with a password and/or username that the user uses to access a network and the password and/or username are automatically filled when an enrolled and authenticated user, subsequently attempts to access the network.

22. The system of claim 14, wherein plural voice inputs are stored as a template, allowing the user to store plural passwords to access the device.

23. The system of claim 14, wherein plural user voice inputs are stored in plural templates, allowing plural users to be enrolled so that the plural users can securely access the device.

24. The system of claim 14, wherein the template is stored in a secured area of the non-volatile memory cells.

25. The system of claim 14, wherein when the device interfaces with the host system, an application is launched to authenticate the user by receiving a voice input from the user and comparing the voice input with the template and after the user is authenticated, the host system is allowed access information stored in the device.

26. The system of claim 14, wherein if an unauthorized user attempts to access the device, the device is re-initialized and during re-initialization the template and any data associated with the user is erased.

* * * * *